US011151168B2

(12) United States Patent
Wexler et al.

(10) Patent No.: US 11,151,168 B2
(45) Date of Patent: *Oct. 19, 2021

(54) HIERARCHICAL SEARCH FOLDERS FOR A DOCUMENT REPOSITORY

(71) Applicant: Zorroa Corporation, Berkeley, CA (US)

(72) Inventors: Daniel E. Wexler, Soda Springs, CA (US); Matthew Chambers, Boston, MA (US)

(73) Assignee: Zorroa Corporation, San Francisco, CA (US)

( * ) Notice: Subject to any disclaimer, the term of this patent is extended or adjusted under 35 U.S.C. 154(b) by 60 days.

This patent is subject to a terminal disclaimer.

(21) Appl. No.: 16/675,187

(22) Filed: Nov. 5, 2019

(65) Prior Publication Data

US 2020/0142911 A1 May 7, 2020

Related U.S. Application Data

(63) Continuation of application No. 15/232,759, filed on Aug. 9, 2016, now Pat. No. 10,467,257.

(51) Int. Cl.
*G06F 16/28* (2019.01)
*G06F 16/21* (2019.01)
(Continued)

(52) U.S. Cl.
CPC ............ *G06F 16/285* (2019.01); *G06F 16/14* (2019.01); *G06F 16/148* (2019.01);
(Continued)

(58) Field of Classification Search
CPC ... G06F 16/14; G06F 17/30115; G06F 16/285
See application file for complete search history.

(56) References Cited

U.S. PATENT DOCUMENTS 6,035,055 A 3/2000 Wang et al.
2003/0009493 A1 1/2003 Parker et al.
(Continued)

FOREIGN PATENT DOCUMENTS

WO WO2012/030586 A1 3/2012

OTHER PUBLICATIONS

"List all files in all subfolders". Retrieved from https://superuser.com/questions/32771/list-all-files-in-all-subfolders/1256324. Feb. 23, 2009. 6 pages.*

(Continued)

*Primary Examiner* — Charles E Lu
(74) *Attorney, Agent, or Firm* — Morgan, Lewis & Bockius LLP

(57) ABSTRACT

A computing system receives user input selecting a first search folder in a hierarchical set of search folders for a collection of documents. The system identifies documents of the first search folder by: (i) executing a predefined query specified for the first search folder to dynamically retrieve documents, if any, from the collection of documents, that satisfy the specified query, (ii) identifying documents, if any, from the collection of documents, that are individually associated with the first search folder, (iii) determining whether the search folder includes one or more subfolders, and (iv) in accordance with a determination that the search folder includes one or more subfolders, recursively performing (i), (ii), (iii), and (iv) on each of the one or more subfolders of the first search folder, to retrieve documents, if any, contained in the one or more subfolders. The system displays the identified documents to the user.

19 Claims, 18 Drawing Sheets

(51) Int. Cl.
- *G06F 16/51* (2019.01)
- *G06F 16/16* (2019.01)
- *G06F 16/248* (2019.01)
- *G06F 16/14* (2019.01)

(52) U.S. Cl.
CPC .......... *G06F 16/168* (2019.01); *G06F 16/21* (2019.01); *G06F 16/248* (2019.01); *G06F 16/51* (2019.01)

(56) References Cited

U.S. PATENT DOCUMENTS

| | | | |
|---|---|---|---|
| 2003/0236752 | A1 | 12/2003 | Dawson et al. |
| 2004/0070678 | A1 | 4/2004 | Toyama et al. |
| 2005/0007625 | A1 | 1/2005 | Garcia |
| 2005/0154754 | A1* | 7/2005 | Sheldon ............... G06F 3/0481 |
| 2005/0160079 | A1* | 7/2005 | Turski ............... G06Q 30/0623 |
| 2007/0203922 | A1 | 8/2007 | Thomas |
| 2007/0273702 | A1 | 11/2007 | Ishii |
| 2008/0228799 | A1 | 9/2008 | Fagin |
| 2008/0281820 | A1 | 11/2008 | Do et al. |
| 2008/0304808 | A1 | 12/2008 | Newell et al. |
| 2009/0009493 | A1 | 1/2009 | Hong |
| 2009/0106271 | A1 | 4/2009 | Chieu et al. |
| 2009/0157638 | A1 | 6/2009 | Flynn et al. |
| 2009/0164946 | A1 | 6/2009 | Liddington |
| 2009/0203368 | A1 | 8/2009 | Marsyla |
| 2009/0208116 | A1 | 8/2009 | Gokturk et al. |
| 2010/0076947 | A1 | 3/2010 | Kurapat et al. |
| 2010/0094807 | A1* | 4/2010 | Farlee ............... G06F 11/1466 707/640 |
| 2011/0022394 | A1 | 1/2011 | Wide |
| 2011/0047163 | A1 | 2/2011 | Chechik |
| 2011/0145232 | A1 | 6/2011 | Chang et al. |
| 2012/0304247 | A1* | 11/2012 | Badger ............... G06F 16/951 726/1 |
| 2015/0016700 | A1 | 1/2015 | Drozdzal et al. |
| 2015/0296228 | A1 | 10/2015 | Chen et al. |
| 2015/0347505 | A1 | 12/2015 | Ohashi et al. |
| 2016/0065547 | A1 | 3/2016 | Heinrich |
| 2016/0140146 | A1 | 5/2016 | Wexler et al. |
| 2016/0253625 | A1 | 9/2016 | Casey |

OTHER PUBLICATIONS

Buhler, Office Action, U.S. Appl. No. 15/232,769, dated Jul. 13, 2018, 14 pgs.
Buhler, Final Office Action, U.S. Appl. No. 15/232,769, dated Nov. 29, 2018, 17 pgs.
Buhler, Notice of Allowance, U.S. Appl. No. 15/232,769, dated Feb. 26, 2019, 14 pgs.
Chamber, Notice of Allowance, dated U.S. Appl. No. 15/697,336, dated Mar. 12, 2020, 9 pgs.
"List all files in all subfolders," Retrieved from https://superuser.com/questions/32771/list-all-files-in-all-subfolders/1256324.
Tang, "Exploring Video Streams Using Slit-Tear Visualization," Tang et al. 2008, from: http://grouplab.cpsc.ucalgary.ca/grouplab/uploads/Publications/Publications/2008-SlitTear.AVI.pdf.
Zorroa Corporation, International Search Report and Written Opinion, PCT/US2015/060922, dated Mar. 9, 2016, 9 pgs.
Zorroa Corporation, International Preliminary Report on Patentability, PCT/US2015/060922, dated May 16, 2017, 6 pgs.
Wexler, Office Action, U.S. Appl. No. 14/941,502, dated May 4, 2018, 17 pgs.
Wexler, Final Office Action, U.S. Appl. No. 14/941,502, dated Dec. 7, 2018, 15 pgs.
Wexler, Notice of Allowance, U.S. Appl. No. 14/941,502, dated Mar. 6, 2019, 19 pgs.
Wexler, Office Action, U.S. Appl. No. 15/232,759, dated May 17, 2018, 12 pgs.
Wexler, Final Office Action, U.S. Appl. No. 15/232,759, dated Nov. 8, 2018, 15 pgs.
Wexler, Office Action, U.S. Appl. No. 15/232,759, dated Mar. 5, 2019, 12 pgs.
Wexler, Notice of Allowance, U.S. Appl. No. 15/232,759, dated Jun. 19, 2019, 5 pgs.
Wexler, Office Action, U.S. Appl. No. 16/438,336, dated Oct. 5, 2020, 20 pgs.
Wexler, Notice of Allowance, U.S. Appl. No. 16/438,336, dated Jan. 25, 2021, 19 pgs.

\* cited by examiner

Search Folder ⌐ 402

| folder_id | ⌐ 404 |
| parent_folder | ⌐ 406 |
| query | ⌐ 408 |
| document_list | ⌐ 410 |
| child_folders | ⌐ 412 |
| filter | ⌐ 414 |
| access_metadata | ⌐ 416 |
| ⋮ | |

Figure 4A

Document Reference ⌐ 420

| document_id | ⌐ 422 |
| document_reference | ⌐ 424 |
| document_type | ⌐ 426 |
| keywords | ⌐ 428 |
| location | ⌐ 430 |
| author | ⌐ 432 |
| creation_datetime | ⌐ 434 |
| thumbnail / summary | ⌐ 436 |
| custom_fields | ⌐ 438 |
|   field_name_1 | ⌐ 440-1 |
|   field_value_1 | ⌐ 442-1 |
|   field_name_2 | ⌐ 440-2 |
|   field_value_2 | ⌐ 442-2 |
|   ⋮ | |
|   field_name_r | ⌐ 440-r |
|   field_value_r | ⌐ 442-r |
| ⋮ | |

Figure 4B

```
QueryBuilder getQuery(AssetSearch search) {
    if (search == null) {
        return QueryBuilders.filteredQuery(
                QueryBuilders.matchAllQuery(), getFilter(null));
    }

BoolQueryBuilder query = QueryBuilders.boolQuery();
    if (search.isQuerySet()) {
        query.must(getQueryStringQuery(search));
    }

AssetFilter filter = search.getFilter();
    query.must(folderQuery(filter));

return QueryBuilders.filteredQuery(query, getFilter(filter));
}

QueryBuilder folderQuery(AssetFilter filter) {
    BoolQueryBuilder query = QueryBuilders.boolQuery();
    if (filter.getFolderIds() != null) {
        Set<Integer> folderIds = Sets.newHashSetWithExpectedSize(64);
        for (Folder folder : folderService.getAllDescendants(
                folderService.getAll(filter.getFolderIds()), true)) {
            if (folder.getSearch() != null) {
                query.should(getQuery(folder.getSearch()));
            }
            folderIds.add(folder.getId());
        } if (!folderIds.isEmpty()) {
            query.should(QueryBuilders.termsQuery("folders", folderIds));
        }
    }
    return query;
}
```

Figure 5

HIERARCHICAL SEARCH FOLDERS FOR A DOCUMENT REPOSITORY

CROSS REFERENCE TO RELATED APPLICATIONS

This application is continuation of U.S. patent application Ser. No. 15/232,759, filed Aug. 9, 2016, which is incorporated herein by reference in its entirety.

This application is related to U.S. patent application Ser. No. 14/941,502, filed Nov. 13, 2015, now U.S. Pat. No. 10,318,575, entitled "Systems and Methods of Building and Using an Image Catalog," which is incorporated herein by reference in its entirety.

TECHNICAL FIELD

The disclosed implementations relate generally to searching a document repository and more specifically to retrieving search results using hierarchical dynamic search folders.

BACKGROUND

There are many conventional techniques for searching a collection of documents. Commonly, a search specifies a list of terms, which are matched against terms in the documents or matched against indexed terms for the documents. In some cases, the matching implicitly uses "AND" between each of the terms, requiring a match against all terms. In other cases, the search program does a fuzzy best match using all of the terms. To provide greater control of the returned results, some search tools allow a user to create complex expressions with Boolean logic (e.g., using an SQL query). Although a Boolean query can provide precise control, people have considerable difficulty creating proper Boolean expressions when the expression is not a simple sequence that has just "AND" or just "OR".

SUMMARY

Implementations provide a simplified interface for organizing collections of documents (e.g., images or textual documents) using dynamically defined search folders. A search folder is different from an ordinary folder (which contains only a specified list of files and subfolders). A search folder is also different from an ordinary query (which retrieves only the documents that satisfy the query conditions). The documents "contained" in a search folder include (i) documents specified dynamically in a query associated with the folder, (ii) documents that are explicitly listed as members of the folder, and (iii) documents recursively "contained" in subfolders of the folder. When there are nested subfolders, the contents of the folder include any documents that are contained at any lower level in the subfolder hierarchy. Note that a folder does not actually "contain" documents; when a search folder is opened (e.g., by selecting the folder), a result set is generated and displayed for the user. In addition, a single document can be contained in multiple folders (whether hierarchically related or not). Documents need not be included in any folder.

The hierarchical nature of folders provides a simplified interface for constructing complex Boolean queries. Hierarchical folders provide an intuitive mechanism to construct queries that enable combinations of different searches in any order. Because the queries associated with the folders are dynamic, new documents can be added to a document repository without updating the folder taxonomy and without user input to classify the new documents.

Some implementations can generate dynamic folder hierarchies automatically based on user-specified aggregations of data fields. For example, suppose each document has a creation date. A user can specify aggregation by year, thereby creating a folder for each year that has at least one document. When documents are added or removed from the repository, the aggregation is repeated, which may result in creating new search folders or removing search folders. If the user wants to further subdivide the documents by month, a two level hierarchy can be generated that includes month subfolders only for months in which there is at least one document. The levels in the hierarchy need not be based on the same field. For example, a document collection with images for basketball teams may be subdivided into search folders based on team name at the top level, then by date at the second level. Alternatively, a search folder taxonomy may be created with year at the top level and team at the second level. In fact, a user could create both of the previous taxonomies and use whichever search folders are most helpful for a particular task.

When a multi-level hierarchy is created, the lowest level search folders include non-empty search queries. Because the higher level search folders in the hierarchy inherently include the documents from the lower subfolders, the search queries for the higher level folders may be empty.

In accordance with some implementations, a method is performed at a computing system having one or more processors and memory. The process generates a hierarchical set of folders for a collection of documents. Each folder (i) specifies a respective rule (which may be empty) for identifying a respective subset of the collection of documents, (ii) specifies a respective user-defined set of zero or more documents from the collection of documents, and (iii) specifies a respective set of zero or more folders from the set of folders that are subfolders of the respective folder.

The process receives user input to select a first folder of the set of folders, and generates a result set that includes: (i) documents that satisfy the specified rule for the first folder, (ii) documents from the user-defined set of documents for the first folder; and (iii) documents recursively contained in subfolders of the first folder. The process then displays the result set to the user.

In some instances, the specified rule for the first folder is empty, so that no documents satisfy the specified rule for the first folder.

In some instances, the documents are images.

In some implementations, the process further includes receiving a second user input to specify a filter for the result set and displaying to the user only documents in the result set that satisfy the user-specified filter.

In some implementations, the process receives user input to create one or more of the folders individually and receives user specification of the respective rule for each folder that is created individually.

In some implementations, generating the hierarchical set of folders for the collection of documents includes receiving user specification of a sequence of one or more data fields corresponding to each document in the collection of documents. The process aggregates data values for the sequence of data fields, thereby creating a set of buckets and a corresponding rule for each bucket. The process creates a folder corresponding to each bucket, and the respective rule corresponds to data values in the respective bucket. In some implementations, the process limits the total number of created folders to a predetermined maximum number. In some implementations, the process limits created folders based on a respective count of documents in each bucket (e.g., buckets with at least 5 documents). In some implementations, the default is to generate folders when there is at least one document.

In some implementations, the result set is sorted. In some implementations, the process sorts the result set according to whether each document satisfies the specified rule for the first folder, is a document from the user-defined set of documents for the first folder, or is a document recursively contained in a subfolder of the first folder. For example, some implementations boost the position of documents in the result set when they are included in the user-defined set of documents for the first folder. Some implementations boost the priority of documents that satisfy the rule for the first folder over documents that satisfy rules for subfolders. In some implementations, documents are sorted based on which rule they satisfy in the nesting chain of a sequence of subfolders (e.g., the lower the position in the subfolders, the lower the ranking in the result set). When an individual document is included in the result set based two or more conditions (e.g., a document is explicitly listed in the user-defined set for the first folder and satisfies the rule for a subfolder), the sorting is based on the highest position that would apply.

In some instances, a first document in the collection of documents satisfies the respective rule for a plurality of folders in the set of folders, or satisfies a folder rule for one folder and is part of the user-defined list for another folder.

BRIEF DESCRIPTION OF THE DRAWINGS

FIG. 4A is a skeletal data structure for storing information about a search folder in accordance with some implementations.

FIG. 4B is a skeletal data structure for storing a reference to a document in accordance with some implementations.

FIG. 5 provides a source code listing for generating a search query corresponding to a search folder in accordance with some implementations.

Like reference numerals refer to corresponding parts throughout the drawings.

DESCRIPTION OF IMPLEMENTATIONS

Reference will now be made to various implementations, examples of which are illustrated in the accompanying drawings. In the following detailed description, numerous specific details are set forth in order to provide a thorough understanding of the invention and the described implementations. However, the invention may be practiced without these specific details. In other instances, well-known methods, procedures, components, and circuits have not been described in detail so as not to unnecessarily obscure aspects of the implementations.

Figure 1:
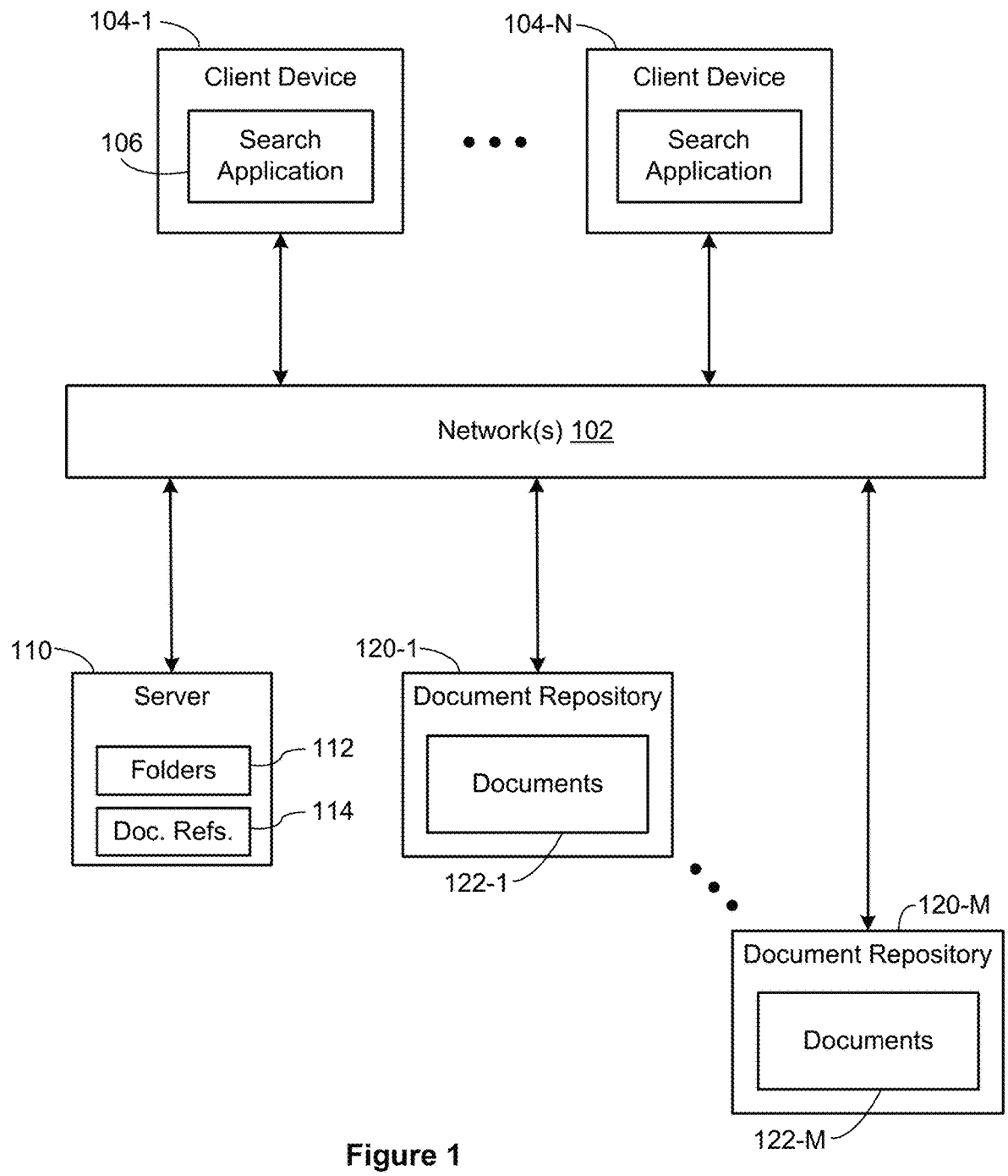
FIG. 1 is a block diagram of a context in which some implementations operate.

FIG. 1 illustrates a context in which some implementations operate. Document repositories 120 (e.g., 120-1 to 120-M) store documents 122 (e.g., documents 122-1 to 122-M). A typical document repository 120 may store millions of documents or more. In some implementations, the documents are text documents. In some implementations, the documents are images (e.g., JPEG, TIFF, PNG, GIF, BMP, CGM, or SVG). In some implementations, the documents are media files, such as movies or sound recordings. In some implementations, the documents in a repository 120 are all of the same type, but some repositories 120 include a heterogeneous collection of documents.

In the illustrated implementation, there is a separate server 110, which stores information about the documents 122 in the repositories 120. In some implementations, a server 110 stores one or more document repositories 120, but typically the server 110 is distinct from the repositories 120. The server includes a database of document references 114, which store information about the documents. A skeletal data structure for the document references 114 is illustrated below in FIG. 4B. A document reference contains information about a document, but does not store the document itself (but may contain a thumbnail image or document extract).

The server 110 here also stores a set of search folders 112. Each search folder provides a definition of what documents to include. A skeletal data structure for a search folder is illustrated below in FIG. 4A, and the hierarchical nature of search folders is illustrated below in FIG. 4C.

The data in the servers 110 and the document repositories 120 are accessed by client devices 104 running a search application 106. When a user selects a search folder, the retrieval module 226 (at the client device 104 or the server 110) retrieves the relevant documents (or concise summaries of the documents, such as thumbnail images), and returns the result set to the client device 104. The communication between the client devices 104, server 110, and document repositories 120 is over one or more networks 102, such as local networks and the Internet.

In some implementations, some or all of the functionality described with respect to the server 110 is performed by the client device 104.

Figure 2:
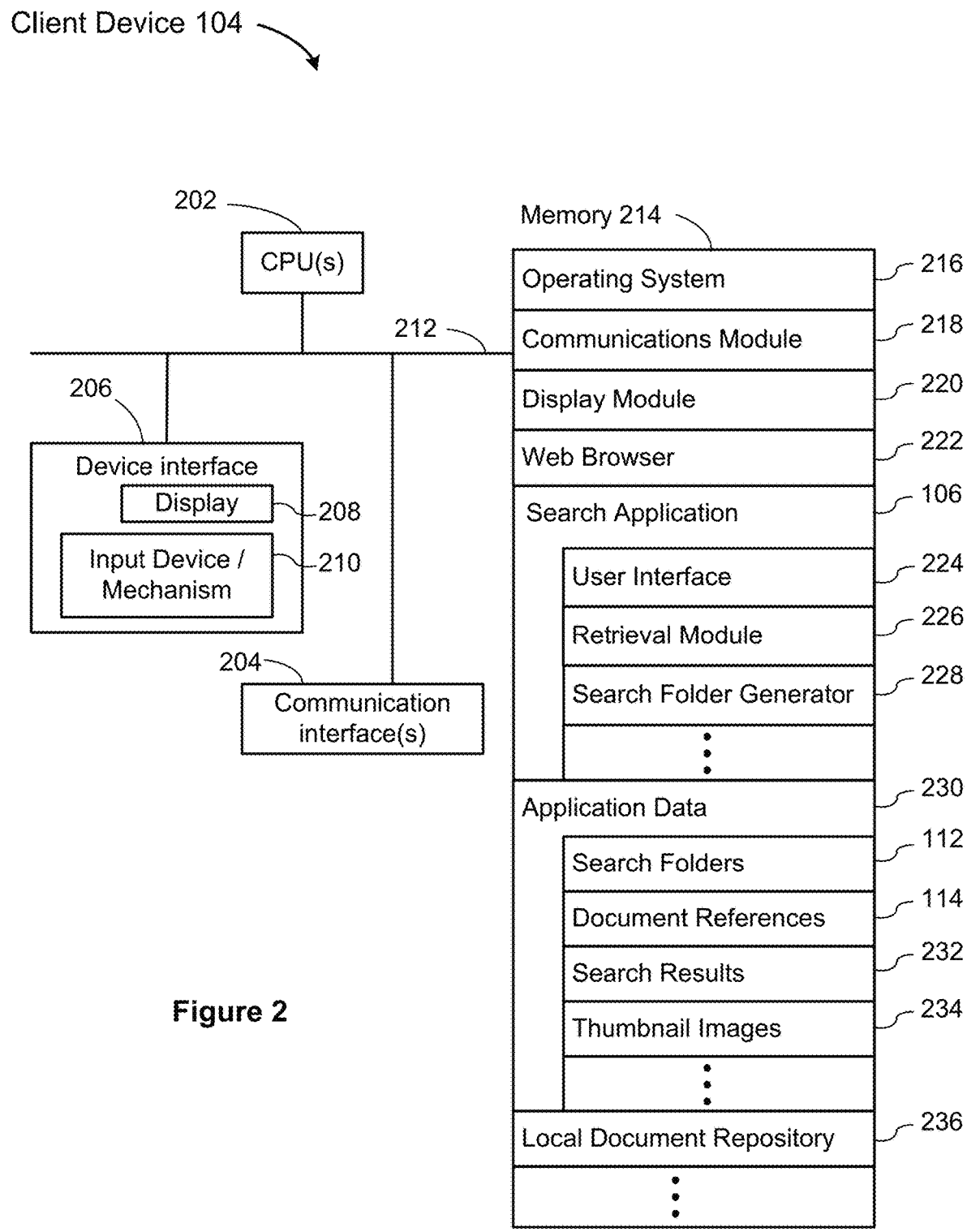
FIG. 2 is a block diagram of a client device in accordance with some implementations.

FIG. 2 is a block diagram illustrating a client device 104 that a user uses to access a search application 106. A client device is also referred to as a computing device, which may be a tablet computer, a laptop computer, a smart phone, a desktop computer, a PDA, or other computing device than can run the search application 106 and has access to a communication network 102. A client device 104 typically includes one or more processing units (CPUs) 202 for executing modules, programs, or instructions stored in the memory 214 and thereby performing processing operations; one or more network or other communications interfaces 204; memory 214; and one or more communication buses 212 for interconnecting these components. The communication buses 212 may include circuitry (sometimes called a chipset) that interconnects and controls communications between system components. A client device 104 includes a device interface 206 comprising a display device 208 and one or more input devices or mechanisms 210. In some implementations, the input device/mechanism includes a keyboard and a mouse; in some implementations, the input device/mechanism includes a "soft" keyboard, which is displayed as needed on the display device 208, enabling a user to "press keys" that appear on the display 208.

In some implementations, the memory 214 includes high-speed random access memory, such as DRAM, SRAM, DDR RAM or other random access solid state memory devices. In some implementations, the memory 214 includes non-volatile memory, such as one or more magnetic disk storage devices, optical disk storage devices, flash memory devices, or other non-volatile solid state storage devices. In some implementations, the memory 214 includes one or more storage devices remotely located from the CPU(s) 202. The memory 214, or alternately the non-volatile memory device(s) within the memory 214, comprises a non-transitory computer readable storage medium. In some implementations, the memory 214, or the computer readable storage medium of the memory 214, stores the following programs, modules, and data structures, or a subset thereof:

- an operating system 216, which includes procedures for handling various basic system services and for performing hardware dependent tasks;
- a communications module 218, which is used for connecting the client device 104 to other computers and devices via the one or more communication network interfaces 204 (wired or wireless) and one or more communication networks 102, such as the Internet, other wide area networks, local area networks, metropolitan area networks, and so on;
- a display module 220, which receives input from the one or more input devices 210, and generates user interface elements for display on the display device 208;
- a web browser 222, which enables a user to communicate over a network 102 (such as the Internet) with remote computers or devices;
- a search application 106, which enables a user to search and retrieve documents from one or more remote document repositories 120 or local document repository 236. The search application 106 provides a user interface 224, as illustrated below by the screenshots in FIGS. 6A-6L. The search application 106 also includes a retrieval module 226, which retrieves documents corresponding to a search folder or retrieves document summaries for the documents corresponding to the search folder. The search application 106 also includes a search folder generator 228, which enables a user to specify a search folder taxonomy that is automatically built based on the user specification and the documents in the specified repository or collection; and
- application data 230, which includes a set of search folders 112, a set of document references 114, search results 232 corresponding to a search folder, and thumbnail images 234 (or document summaries) for the documents in a search folder.

Each of the above identified executable modules, applications, or sets of procedures may be stored in one or more of the previously mentioned memory devices and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 may store a subset of the modules and data structures identified above. Furthermore, the memory 214 may store additional modules or data structures not described above.

Although FIG. 2 shows a client device 104, FIG. 2 is intended more as a functional description of the various features that may be present rather than as a structural schematic of the implementations described herein. In practice, and as recognized by those of ordinary skill in the art, items shown separately could be combined and some items could be separated.

Figure 3:
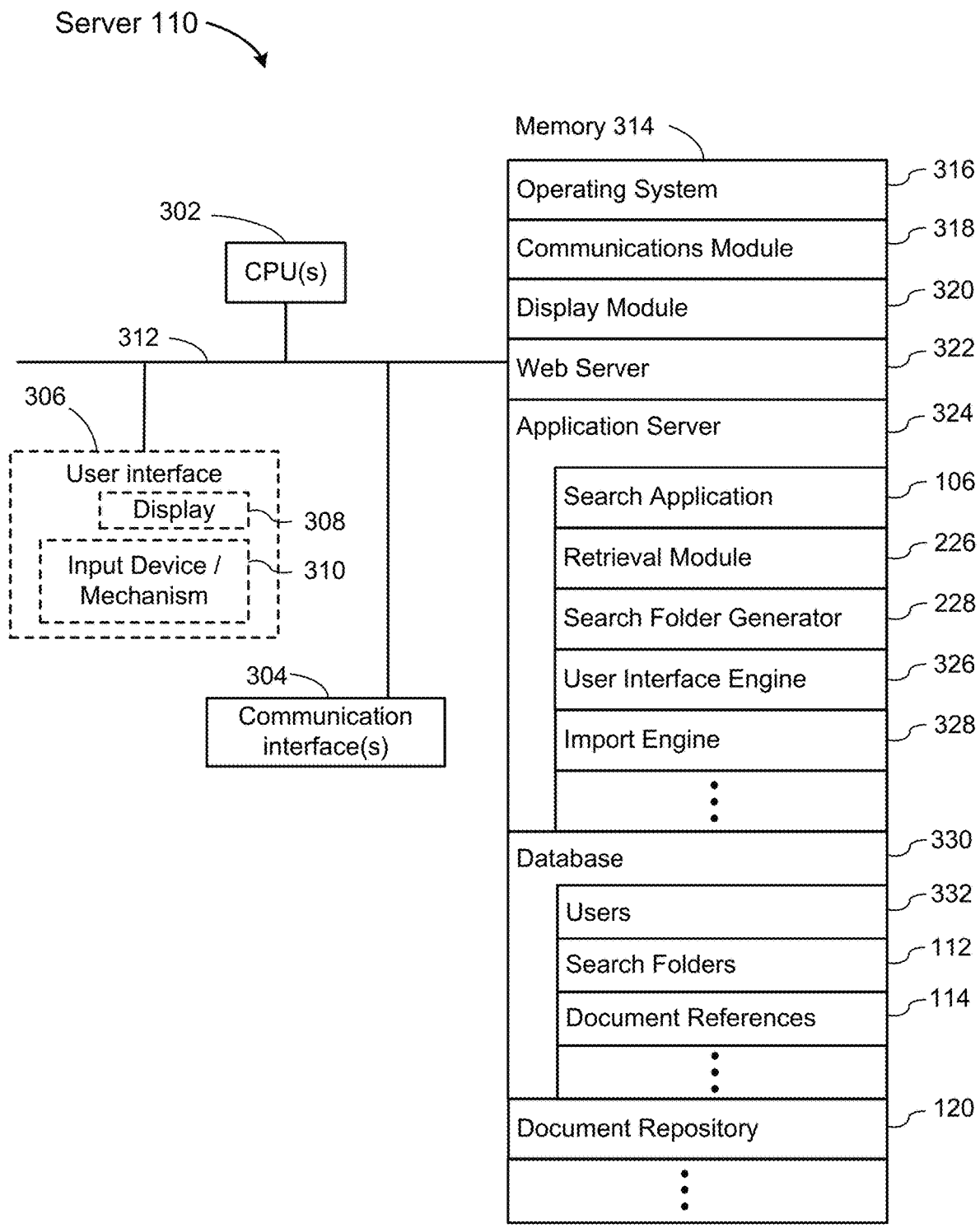
FIG. 3 is a block diagram of a server in accordance with some implementations.

FIG. 3 is a block diagram illustrating a server 110. In some implementations, a server 110 is one of a plurality of servers in a server system. A server 110 typically includes one or more processing units (CPUs) 302 for executing modules, programs, or instructions stored in the memory 314 and thereby performing processing operations; one or more network or other communications interfaces 304; memory 314; and one or more communication buses 312 for interconnecting these components. The communication buses 312 may include circuitry (sometimes called a chipset) that interconnects and controls communications between system components. In some implementations, a server 110 includes a user interface 306, which may include a display device 308 and one or more input devices 310, such as a keyboard and a mouse.

In some implementations, the memory 314 includes high-speed random access memory, such as DRAM, SRAM, DDR RAM or other random access solid state memory devices. In some implementations, the memory 314 includes non-volatile memory, such as one or more magnetic disk storage devices, optical disk storage devices, flash memory devices, or other non-volatile solid state storage devices. In some implementations, the memory 314 includes one or more storage devices remotely located from the CPU(s) 302. The memory 314, or alternately the non-volatile memory device(s) within the memory 314, comprises a non-transitory computer readable storage medium. In some implementations, the memory 314, or the computer readable storage medium of the memory 314, stores the following programs, modules, and data structures, or a subset thereof:

- an operating system 316, which includes procedures for handling various basic system services and for performing hardware dependent tasks;
- a communications module 318, which is used for connecting the server 110 to other computers via the one or more communication network interfaces 304 (wired or wireless) and one or more communication networks 102, such as the Internet, other wide area networks, local area networks, metropolitan area networks, and so on;
- a display module 320, which receives input from one or more input devices 310, and generates user interface elements for display on a display device 308;
- one or more web servers 322, which receive requests from a client device 104, and return responsive web pages, resources, or links. In some implementations, each request is logged in the database 330;
- one or more application servers 324, which provide various applications (such as a search application 106) to the client devices 104. In some instances, applications are provided as a set of web pages, which are delivered to the client devices 104 and displayed in a web browser 222. The web pages are delivered as needed or requested. In some instances, an application is delivered to a client device 104 as a download, which is installed and run from the client device 104 outside of a web browser 222;

in some implementations, the application server provides a retrieval module 226 as part of the search application 106. In other implementations, the retrieval module 226 is a separate application provided by the application server 324. The retrieval module retrieves documents corresponding to a search folder or document summaries for the documents corresponding to the search folder;

the search application 106 also includes a search folder generator 224, which enables a user to specify a search folder taxonomy that is automatically built based on the user specification and the documents in the specified repository or collection;

some implementations include a user interface engine 326, which provides the user interface 224 for users of the search application 106;

the search application 106 also includes an import engine 328, which adds new document references 114 to the database 330. Typically, the actual content of the imported documents remains in the original document repository, and is not copied. Some implementations use a Document References table 420, as illustrated in FIG. 4B. During an import process, the import engine 328 executes procedures to determine the values of the data structure elements, including the fields 438. This is described in more detail below with respect to FIG. 4B;

one or more databases 330, which store various data used by the modules or programs identified above. In some implementations, the database 330 includes a list of authorized users 332, which may include user names, encrypted passwords, and other relevant information about each user. The database 330 also stores the search folder definitions 112 as well as the document references 114; and in some cases, the server 110 includes a document repository 120, which contains the actual document contents (e.g., images).

Each of the above identified elements in FIG. 3 may be stored in one or more of the previously mentioned memory devices. Each executable program, module, or procedure corresponds to a set of instructions for performing a function described above. The above identified modules or programs (i.e., sets of instructions) need not be implemented as separate software programs, procedures or modules, and thus various subsets of these modules may be combined or otherwise re-arranged in various implementations. In some implementations, the memory 314 stores a subset of the modules and data structures identified above. Furthermore, the memory 314 may store additional modules or data structures not described above.

Although FIG. 3 illustrates a server 110, FIG. 3 is intended more as functional illustration of the various features that may be present in a set of one or more servers rather than as a structural schematic of the implementations described herein. In practice, and as recognized by those of ordinary skill in the art, items shown separately could be combined and some items could be separated. The actual number of servers used to implement these features, and how features are allocated among them, will vary from one implementation to another, and may depend in part on the amount of data traffic that the system must handle during peak usage periods as well as during average usage periods.

As illustrated in FIGS. 2 and 3, the functionality for a search application may be shared between a client device 104 and a server system 110. In some implementations, after the search application is installed on a client device 104, the majority of the subsequent processing occurs on the client device. For example, the search folders 112 and document references 114 may be stored solely at the client device 104, and not on a server 110. In other implementations, the majority of the processing and data storage occurs at a server 110, and the client device 104 uses a web browser 222 to view and interact with the data. For example, the search folders 112 and document references 114 may be stored only at the server system 110. One of skill in the art recognizes that various allocations of functionality between the client device 104 and the server system 110 are possible, and some implementations support multiple configurations (e.g., based on user selection).

FIG. 4A shows a skeletal search folder table 402. The search folder table 402 includes a unique folder ID 404. In some implementations, the search folder table 402 includes a parent folder ID 406, which specifies a parent folder (if any). When the parent folder 406 is empty or NULL, the search folder is implicitly a child of the root node. Some implementations include a search folder for the root, in which case it is the only search folder without a parent.

Each search folder specifies a query (or rule) 408, which can be executed to retrieve documents identified in the document references table 420. A query can be empty (or NULL), in which case no documents satisfy the query. A query 408 can be based on data in the document references table 420. In some implementations, the query is stored in a format similar to an SQL "where" clause. In some implementations, the query can specify a fuzzy search based on document content. One of skill in the art recognizes that queries may be specified in various formats, and the disclosed implementations may use any such format. Because a query is specified as a rule, the documents that satisfy the query can change over time as documents are added or removed from the universe of possible documents.

In addition to the rule-based query 408, the search folder table 402 includes a document list 410, which is an explicit list of individual documents. In some implementations, the document list 410 is a list of document IDs 422. The document list 410 can be empty.

The search folder table also includes a child folder list 412. This is a list of pointers in the opposite direction of the parent folder ID 406. In some implementations that include a parent folder ID 406 in the search folder table 402, the child folder list 412 is omitted because it is redundant. One of skill in the art recognizes that there are multiple ways to capture the parent/child hierarchy.

In some implementations, the search folder table 402 includes a filter 414, which can be used to limit the documents retrieved by each search folder. In some implementations, a filter 414 can be specified in a format like a query expression 408. In some implementations, a filter is applied after all of the documents for a search folder have been gathered, including documents corresponding to the query 408, documents corresponding to the document list 410, and documents corresponding to any of the subfolders (including nested subfolders). In some implementations, the filter is not applied to documents that are in the document list 410 or in the document list of one of the subfolders. In some implementations, the filter for a search folder applies only to documents retrieved by that specific search folder (the query 408 and the document list 410), but does not apply to documents retrieved by subfolders.

Figure 6A:
FIGS. 6A and 6B are screenshots illustrating display of documents in a parent folder and a child folder in accordance with some implementations.
Figure 6B:
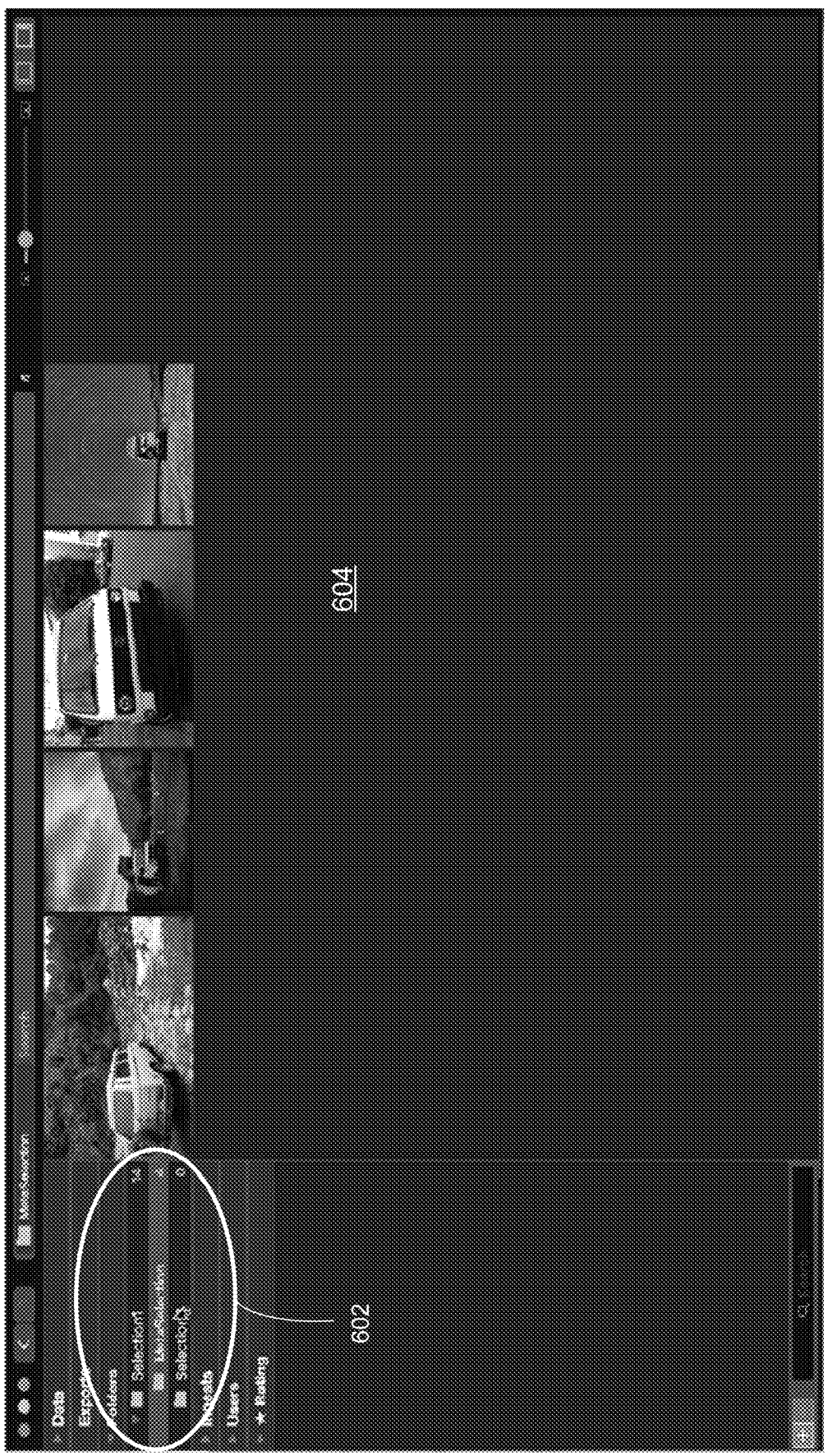
Figure 6C:
FIGS. 6C-6E illustrate manually adding individual documents to a folder in accordance with some implementations.
Figure 6D:
Figure 6E:
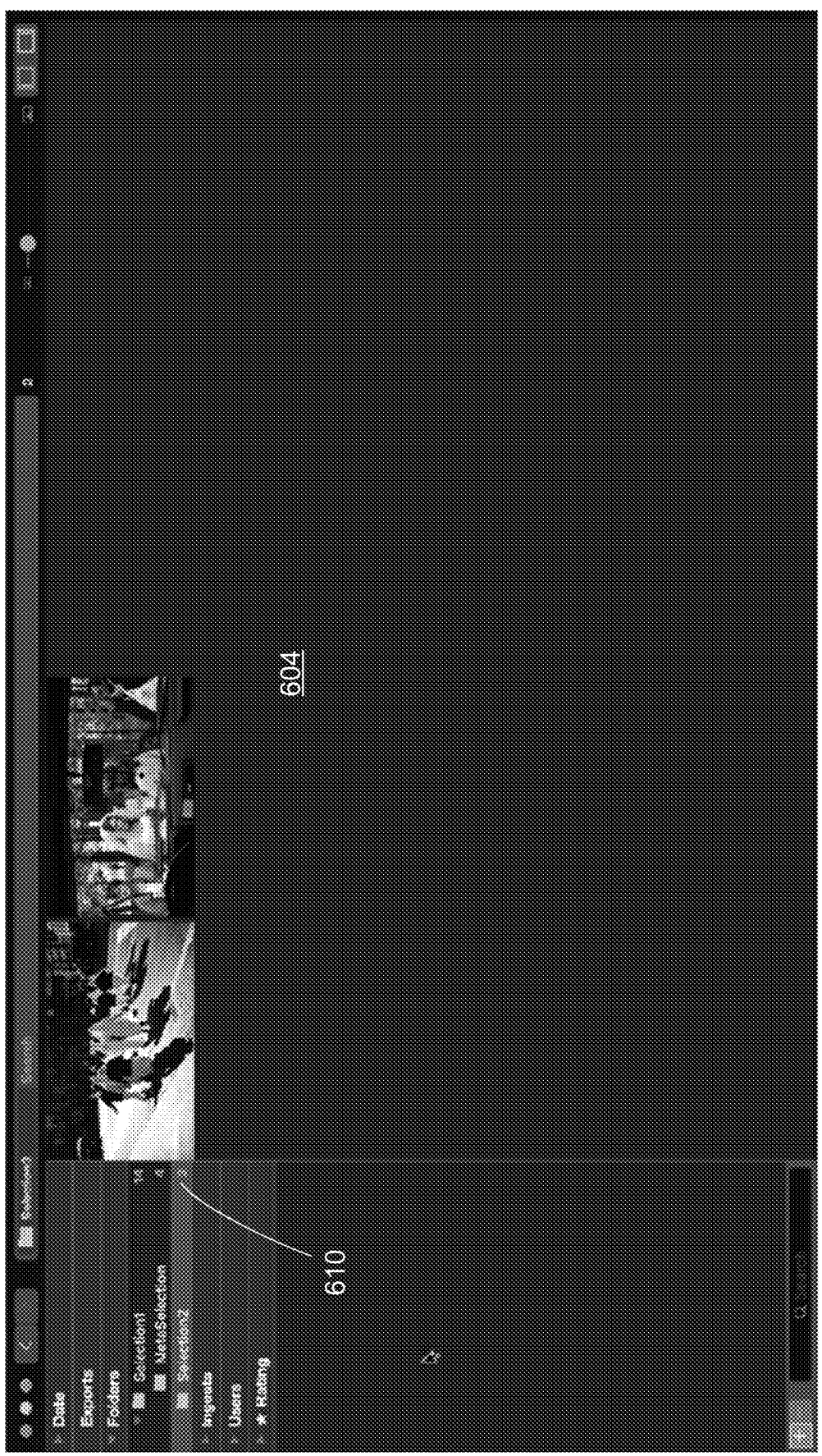
Figure 6F:
FIGS. 6F-6I illustrate creating a folder based on a search in accordance with some implementations.
Figure 6G:
Figure 6H:
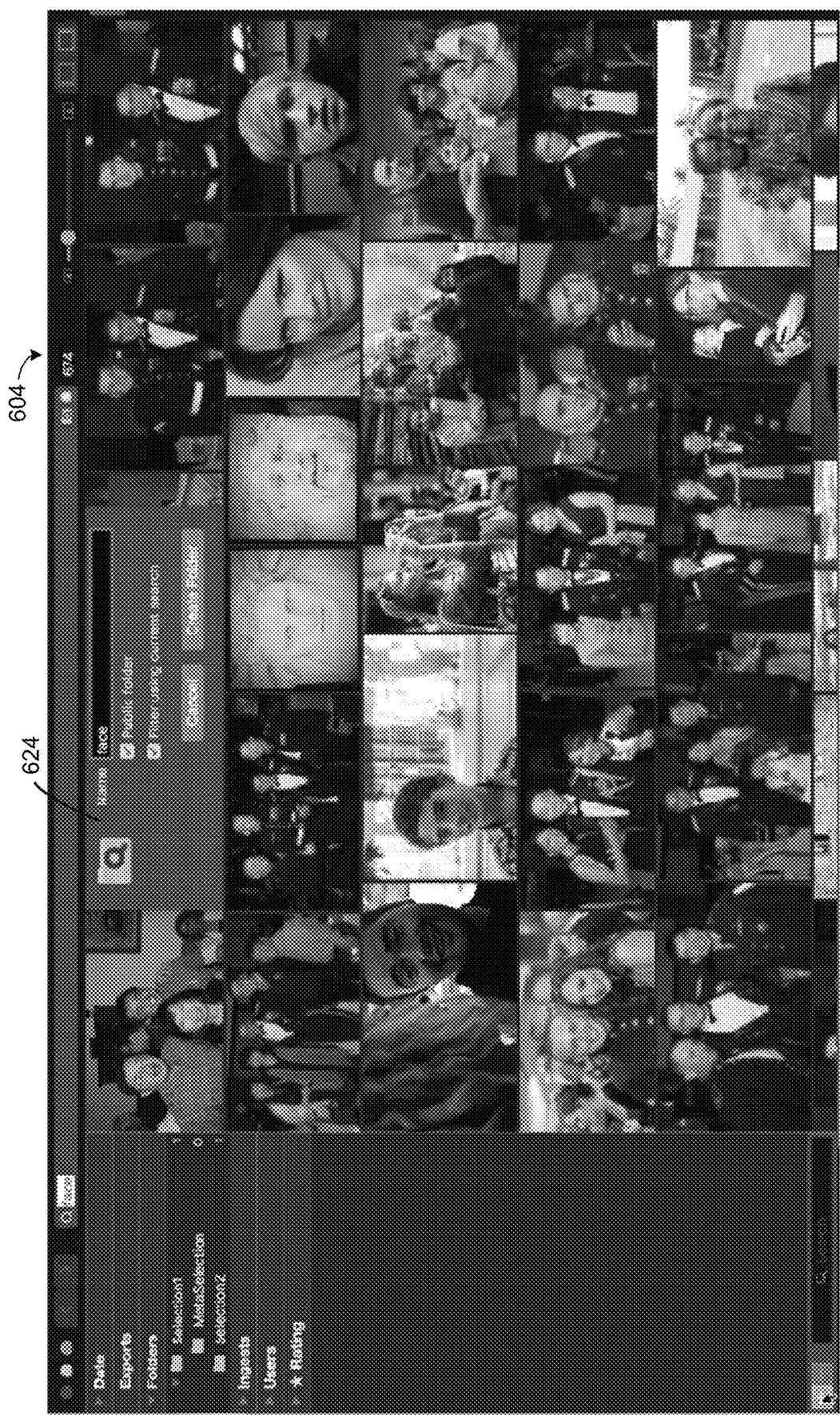
Figure 6I:
Figure 6J:
FIGS. 6J and 6K illustrate applying a filter to a collection of retrieved documents in accordance with some implementations.
Figure 6K:

In some implementations, filters are selected, created, and applied without regard to the currently selected search folder, as illustrated in FIGS. 6J and 6K below. Such a filter is not stored in the search folder table. Some implementations provide for filters that are stored in the search folder table as well as a "current" filter that applies to whatever search folder the user selects (and remains the current filter until changed by the user, regardless of what search folder is selected).

The search folder table 402 also includes various access metadata 416, such as when the search folder was created, who created the search folder, who last modified the search folder, when the folder was last accessed, who has access to the search folder, and so on.

FIG. 4B shows a skeletal document references table 420. Each record in the document references table 420 identifies a document in one of the document repositories 420. Each document is uniquely identified by a document ID 422, and includes a document reference pointer 424 to identify the location of the document. For example, the document reference may specify a full path name, including server, volume, path, and file name for a document stored on a local area network, or a URL with a file name for documents retrieved over the Internet. Some implementations store a document type 426 for each document. In some implementations, the document type 426 corresponds to the file name extension of the document, such as "PDF", "JPEG", "TIFF", "PNG", "BMP", "TXT", and so on. In some implementations, the document type specifies a general category for each document, such as "TEXT" or "IMAGE".

In some implementations, the document references table includes a list of keywords 428 for each document. In some implementations, the keywords are indexed. In some implementations, the keywords are indexed, and not included in the document references table.

In some instances, location information is available for the documents, which identifies where the document was created. For example, when the documents are images, GPS coordinates may be available for some of the images, and these coordinates are stored as a location 430 for the document.

In some implementations, other metadata is stored for each document, such as an author 432 and/or a creation datetime 434.

In some implementations, the document references table also includes a thumbnail image or document summary 436. For images, this is typically a small low-resolution copy of the image that can be used for reviewing many images at the same time. For textual documents, some implementations generate a summary or abstract of the document, such as a title and some key sentences.

In addition to the typical metadata stored for documents, some implementations enable extraction of other custom fields as well. For example, for a collection of images for major league baseball, each of the images could be assigned one or more team names, one or more player names, one or more corporate names whose logos are captured in the images, and so on. This information can be stored in the custom fields 438. In some implementations there is a fixed number of possible custom fields, and a field name can be assigned to each one. In other implementations, there is a collection of field_name/field_value pairs, and the number is not limited. One of skill in the art recognizes that there are multiple ways to store such custom data. In the illustrated implementation, there is a fixed set of r field names (field_name_1 440-1, field_name_2 440-2, . . . , field_name_r 440-r) and r corresponding field values (field_value_1 442-1, field_value_2 442-2, . . . , field_value_r 442-r). In some implementations, all of the documents within one collection share the same set of custom fields. In other implementations, each collection has a set of custom fields that are defined, and only the ones that have corresponding values are stored.

The document references table 420 is typically populated by the import engine 328 during an import process. The user specifies various parameters for an import operation, such as a location of the repository, a directory of files in the repository, an optional filter of which documents to select, and so on. In some instances, the user specifies which custom fields to populate during the import process. Some of the techniques used for extracting information during the import process are described in application Ser. No. 14/941,502, filed Nov. 13, 2015, entitled "Systems and Methods of Building and Using an Image Catalog," which is incorporated herein by reference in its entirety.

The example Search Folder table 402 and Document Reference table 420 illustrate tracking manually added documents using the document_list field 410 in the Search folder table 402. In this way, each search folder specifies its own manually added documents. Some implementations take an alternative approach in which each document specifies the search folders to which it has been manually added. For example, some implementations include a folder_list field in the Document Reference table 420, which is a list of folder_id values corresponding to the search folders to which the document has been manually added. In this implementation, the document_list field 410 is typically omitted from the Search Folder table 402.

Figure 4C:
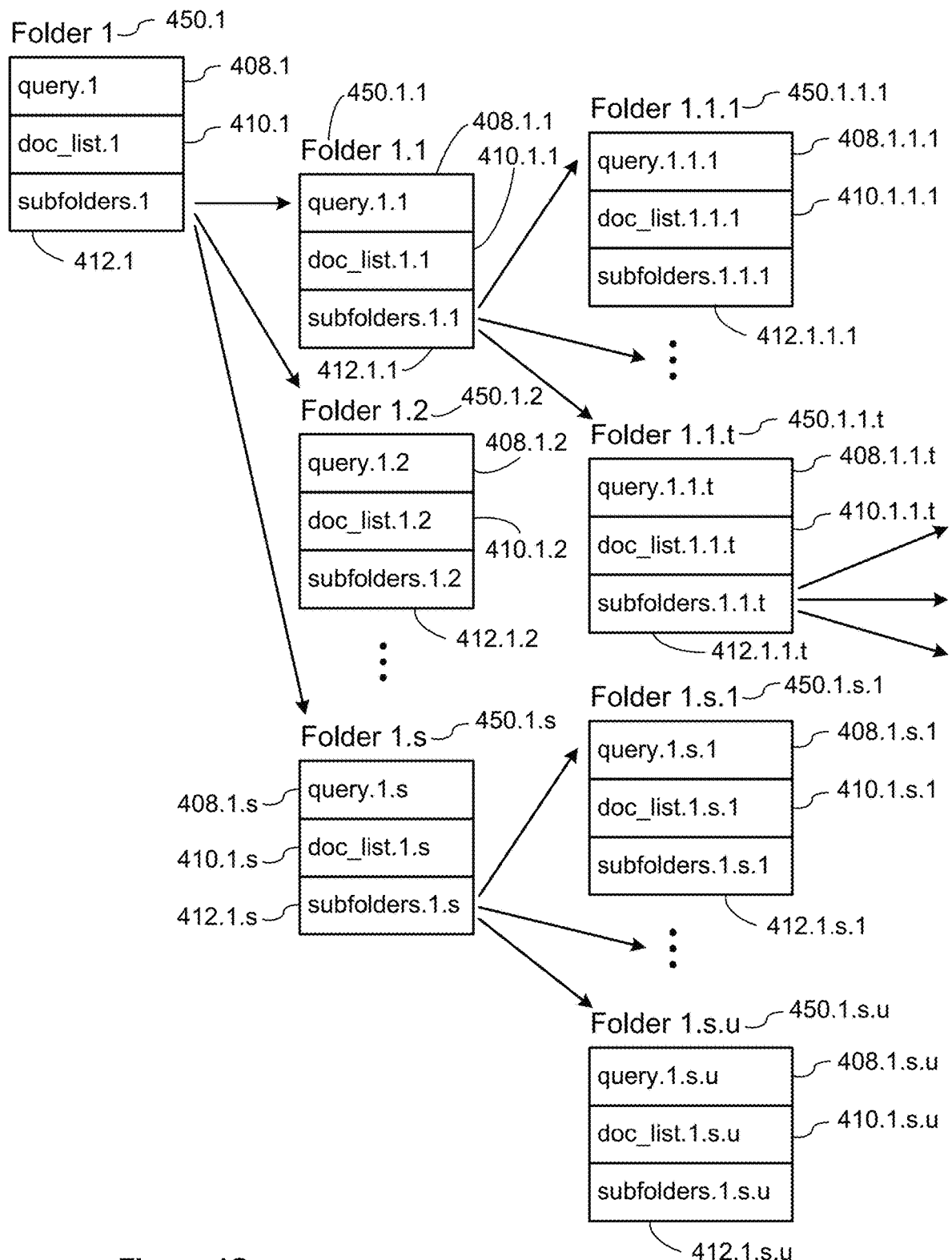
FIG. 4C illustrates a portion of a folder hierarchy in accordance with some implementations.

FIG. 4C illustrates the hierarchical relationship between search folders, and indicates what documents are "contained" within a search folder. In this example, a user has selected Folder 1 (450.1). The documents included in this search folder include all of the documents that satisfy the rule query.1 (408.1) as well as all documents explicitly in doc_list.1 (410.1). In addition, Folder 1 includes all documents recursively contained in any subfolders of Folder 1. At the first level of nesting, this includes all documents that satisfy any of the rules for query.1.1 (408.11), query.1.2 (408.1.2), . . . , or query.1.s (408.1.s). In addition, the documents for Folder 1 include all of the documents explicitly listed in doc_list.1.1, doc_list.1.2, . . . , or doc_list.1.s.

In addition, each of the search folders Folder 1.1 (450.1.1), Folder 2 (450.1.2), . . . , Folder 1.s (450.1.s) can have its own subfolders, and the documents from those subfolders are contained in Folder 1. The nesting is not limited, so there are potentially many subfolders whose documents will be included in Folder 1. In particular, for each folder 1.* in FIG. 4C, all documents that satisfy the rule query1.* are contained in Folder 1 and all documents included in the list doc_list.1.* are contained in Folder 1. Although conceptually complex, some of the queries, document lists, and subfolder lists are typically empty.

A search folder, such as Folder 1 (450.1), is used to generate a database query, which returns all of the documents contained in the folder, as described above. FIG. 5 provides a source code listing for one implementation that uses Elasticsearch™ objects. Some implementations further tweak the order of the returned results by prioritizing documents that were manually added to the search folder (e.g., specified in the document list doc_list.1 (410.1) by increasing the ranking of those documents over the dynamic searches based on rule queries. Some implementations reduce the rank of documents from child queries (e.g., query.1.1 (408.1.1)) in order to rank higher level folders in the hierarchy above lower level folders. Some implementations rank the documents in the opposite order, with lower level child queries receiving a ranking boost relative to higher level queries. Some implementations enable a user to set permanent or temporary preferences regarding how to tweak the ranking based on document position in the hierarchy and whether a document satisfies a query rule or is individually identified in a document list.

Search folder hierarchies can be created manually or automatically. Some implementations provide a drag and drop interface as illustrated in FIGS. 6C-6E below. Documents can be dragged individually, or in groups, and dropped into any folder. The manually added documents are added to what is already included in the folder. Unlike desktop folders, search folders contain references to the document content rather than copies of the documents themselves. An additional benefit of this approach is that the same document can exist within multiple folders without duplicating data. Indeed, many different people can create their own search folders for the same document repository, and still maintain only a single copy of the document.

One method for creating a dynamic taxonomy uses aggregations over one or more fields from the repository, including any fields from the document references table 420. The user provides a definition for each level in the hierarchy, and folders are created based on the actual data. For example, a user can specify that the first level of the hierarchy uses the creation_datetime field 434 aggregated by year, and that the second level aggregates the creation_datetime by month. The search folder generator 224 computes the aggregations to determine which years and months have at least one associated document, and creates folders for just those years and months. When the import engine 328 runs, these folder hierarchies are automatically updated to account for documents that are added or removed from the repository.

Some implementations also allow automatic creation of hierarchies using the path to each asset and aggregating over the path components. In some instances, this essentially recreates the folder structure of the document repository, except that empty folders are not created.

Because the generation of the folders can be based on any fields in the document references table 420, the folders can be generated based on data that is not explicitly in the documents. For example, for a repository of images of a sports team, the images can be analyzed to identify faces, and the faces matched against players on the teams. In this way, some of the images can be matched against one or more player names. A user can then automatically generate a set of folders for each of the player names. The folder structure has a many-to-many relationship with the documents: a single player is likely to be associated with many different images, and some of the images include more than one identified player. In addition, there are likely to be many images with no associated player name. A user can easily create a multi-level hierarchy by using both player name and another field, such as year. Depending on intended usage, either the player name or the year could be designated as the top level of the hierarchy.

Figure 6L:
FIG. 6L illustrates displaying metadata for a selected document in accordance with some implementations.

Other fields can be used to create the hierarchy as well, such as the document type field 426. Some implementations utilize the location field 430 to generate geographic folder groupings. For example, using location coordinates, documents (e.g., photographic images) can be grouped into countries, continents, states, cities, rectangles of latitude and longitude coordinates, and so on. FIG. 6L illustrates an image repository whose documents have been associated with countries, and the displayed images are filtered to those in South Korea.

Some implementations define a search folder hierarchy based on a user specified sequence of fields (e.g., fields from the document references table 420) with optional parameters to specify minimum bucket size, bucket ranges, aggregation operation (e.g., count, max, min, or average), maximum number of buckets, and so on. The search folder generator 224 performs the aggregation based on the specified fields and the optional parameters, and creates a search folder for each aggregation bucket. When the hierarchy has multiple levels, the non-empty queries are typically specified only at the lowest level, and the results are thereby included in all of the higher levels.

In a first example of creating a dynamic taxonomy of search folders, a user specifies the field "location" 430, specifies using the location to identify the country, and specifies that the minimum bucket size is 5. The search folder generator determines the country for each of the documents in the repository based on the location field 430, aggregates the documents that have the same country, and counts the number of documents in each bucket. The world has many countries, but a given document repository is not likely to have documents corresponding to each country. Moreover, a country has to have at least five documents to be included in this specific taxonomy. If the country of Nepal has four or fewer documents, there is no search folder created for Nepal. However, if additional documents are subsequently imported, there may be additional documents associated with Nepal. The Taxonomy definition is re-evaluated during the import, so a new search folder may be created for Nepal. Conversely, if some documents are removed from the repository or modified, it could bring the total count for another country below five, and thus the corresponding search folder would be removed.

In a second example, a user has specified the fields player_name and date, and specifies using year for the date. The user also specifies a maximum number of 100 player buckets. In this case, the search folder generator 224 aggregates the documents by player name and by year within player. In this case, however, the user has chosen to limit the number of created folders to 100. When there are more than 100 players (which is likely is the documents span a reasonable period of time), some players must be excluded. The selection of folders is based on the operation applied, which is "count" by default. Therefore, the 100 players who are associated with the greatest number of documents will have corresponding search folders. For a field whose value is a character string (such as player name), the only allowed operation is count, but for numeric fields, the operations of min, max, average, sum, and percentile can be applied. For the location field, the operation is "count", but is applied based on the selected geographic grouping, as illustrated above in the first example. In this second example, the result is that 100 player search folders are created, and for each of these players, a set of subfolders is created based on the years of the documents. When the repository is modified, the top 100 players could change, and the import engine 328 reapplies the definition of the hierarchy to determine the set of search folders.

In a third example, a user specifies the fields actor name and date, and wants to create search folders based on both actor and age range (with five year ranges). Each of the documents is an image that includes the actor or is a movie in which the actor participated. The user first creates a computed age field in the document references table that takes the difference between the creation datetime of the document (photo or movie) and a birthdate of the actor found in a lookup table based on the actor's name. In some implementations, the user can specify that the age ranges are in five year intervals starting with 0; in other implementations, the user specifies the intervals individually (e.g., 0-5, 5-10, etc.). Depending on usage, the user may want to have the actor name or the age ranges as the top level of the hierarchy. In some implementations, when no explicit limits are applied, the search folder generator 224 creates a folder for each non-empty bucket, up to a maximum of 100 buckets. Therefore, if actor name is placed at the top of the hierarchy, only the top 100 actors in the repository will get corresponding search folders. However, if age range is the top of the hierarchy, the number of actors will be limited to 100 within each age range.

FIGS. 6A and 6B are screenshots illustrating display of documents in a parent folder and a child folder in accordance with some implementations. In FIG. 6A, the navigation region 602 indicates that the user has selected search folder "Selection1," which has 14 documents. The 14 documents (thumbnail images of the documents) are shown in the document display region 604. In FIG. 6B, the user has selected the subfolder "MetaSelection" in the navigation region 604, and the corresponding four documents are shown in the document display region 604. The four documents included in the Metaselection search folder (shown in FIG. 6B) were also included in the Selection1 search folder (shown in FIG. 6A).

FIGS. 6C-6E illustrate manually adding individual documents to a folder in accordance with some implementations. In FIG. 6C, a user has selected two documents 606, and in FIG. 6D, the user drags the two documents to the navigation area. As the documents are dragged, the cursor 608 includes small images of the documents being dragged. Prior to dropping the documents in the "Selection2" folder, the document quantity indicator 610 for the folder shows that it contains 0 documents. In FIG. 6E, the document quantity indicator 610 for the folder is updated to show it contains two documents. In addition, the user has subsequently selected the "Selection2" search folder, so the document display region 604 is updated to show the contents of the folder.

FIGS. 6F-6I illustrate creating a folder based on a search in accordance with some implementations. As illustrated in FIG. 6F, some implementations include a search region 620, where a user can enter search terms. In FIG. 6G, the user has entered the search term "face" 622, and in FIG. 6H, the document display region 604 has been updated to match the search term "face" (e.g., documents with the keyword "face"). In addition, the user interface displays a dialog box 624, which enables the user to save the search as a named search folder. When the user clicks the Create Folder button, the new folder "face" 626 is created, as illustrated in FIG. 6I. The contents of the folder are displayed in the document display region 604.

FIGS. 6J and 6K illustrate applying a filter to a collection of retrieved documents in accordance with some implementations. In FIG. 6J, the user interface displays a filter (or facet selection) region 630, which can be used to limit the displayed documents. In FIG. 6K, the user has filtered the display to those documents with the keyword "suit" 632, and the thumbnail images now displayed in the document display region 604 are all associated with the keyword suit. The images illustrate that the keyword "suit" applies to both business suits and swim suits.

FIG. 6L illustrates displaying metadata for a selected document in accordance with some implementations. In some implementations, when an individual document 640 is selected, the metadata display region 642 display metadata for the selected document.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method for searching image catalogs, comprising:
   at a computing system for searching a collection of images in an image catalog using a hierarchical set of search folders, the computing system having one or more processors and memory:
   receiving user input to select a first search folder in the hierarchical set of search folders;
   in response to the user input, identifying images that are currently associated with the first search folder using a recursive traversal of the hierarchical set starting at the first search folder, including, for each search folder in the traversal:
   (i) executing a respective predefined query that specifies search terms for the respective search folder to dynamically retrieve a list of images, if any, from the collection of images, that satisfy the search terms of the respective predefined query for the respective search folder;
   (ii) identifying images, if any, from the collection of images, that are individually associated with the respective search folder;
   (iii) determining whether the respective search folder includes one or more subfolders, each of the one or more subfolders comprising a respective search folder in the hierarchical set of search folders; and
   (iv) in accordance with a determination that the respective search folder includes one or more subfolders, recursively performing (i), (ii), (iii), and (iv) on each of the one or more subfolders of the respective search folder, to retrieve a list of images, if any, contained in the one or more subfolders of the respective search folder; and
   displaying a list of the identified images as contents of the first search folder to the user.

2. The method of claim 1, wherein the respective predefined query that specifies search terms for the respective search folder is empty, so that no images satisfy the respective predefined query for the respective search folder.

3. The method of claim 1, further comprising:
   receiving a second user input to specify a filter for the list of images; and
   displaying to the user only images in the list that satisfy the user-specified filter.

4. The method of claim 1, further comprising generating the hierarchical set of search folders for the collection of images, including receiving user input to create one or more of the search folders individually and receiving user specification of a respective query for each folder that is created individually.

5. The method of claim 1, further comprising generating the hierarchical set of search folders for the collection of images, including:
   receiving user specification of a sequence of one or more data fields corresponding to each image in the collection of images;

aggregating data values for the sequence of one or more data fields, thereby creating a set of buckets and a respective query for each bucket; and creating a respective folder corresponding to each bucket, whose respective query corresponds to data values in the respective bucket.

6. The method of claim 5, further comprising in response to adding or removing images from the collection of images:

regenerating the hierarchical set of search folders according to the sequence of one or more data fields.

7. The method of claim 5, further comprising generating the hierarchical set of search folders for the collection of images, including limiting a total number of created search folders to a predetermined number.

8. The method of claim 5, further comprising generating the hierarchical set of search folders for the collection of images, including limiting created search folders based on a respective count of images in each bucket.

9. The method of claim 1, further comprising sorting the displayed list of identified images of the first search folder according to whether each image is retrieved from performing step (i), step (ii), or step (iv).

10. The method of claim 1, wherein a first image in the collection of images satisfies the predefined query specified for the first search folder and satisfies a predefined query for a second search folder in the set of search folders.

11. A computer system for searching image catalogs, comprising:

one or more processors;

memory; and one or more programs stored in the memory and configured for execution by the one or more processors, the one or more programs comprising instructions for:

receiving user input to select a first search folder in the hierarchical set of search folders;

in response to the user input, identifying images that are currently associated with the first search folder using a recursive traversal of the hierarchical set starting at the first search folder, including, for each search folder in the traversal:

(i) executing a respective predefined query that specifies search terms for the respective search folder to dynamically retrieve a list of images, if any, from the collection of images, that satisfy the search terms of the respective predefined query for the respective search folder;

(ii) identifying images, if any, from the collection of images, that are individually associated with the respective search folder;

(iii) determining whether the respective search folder includes one or more subfolders, each of the one or more subfolders comprising a respective search folder in the hierarchical set of search folders; and (iv) in accordance with a determination that the respective search folder includes one or more subfolders, recursively performing (i), (ii), (iii), and (iv) on each of the one or more subfolders of the respective search folder, to retrieve a list of images, if any, contained in the one or more subfolders of the respective search folder; and displaying a list of the identified images as contents of the first search folder to the user.

12. The computer system of claim 11, wherein the respective predefined query that specifies search terms for the respective search folder is empty, so that no images satisfy the respective predefined query for the respective search folder.

13. The computer system of claim 11, wherein the one or more programs further comprise instructions for:

receiving a second user input to specify a filter for the list of images; and displaying to the user only images in the list that satisfy the user-specified filter.

14. The computer system of claim 11, further comprising instructions for generating the hierarchical set of search folders for the collection of images, including receiving user input to create one or more of the search folders individually and receiving user specification of a respective query for each folder that is created individually.

15. The computer system of claim 11, further comprising instructions for generating the hierarchical set of search folders for the collection of images, including:

receiving user specification of a sequence of one or more data fields corresponding to each image in the collection of images;

aggregating data values for the sequence of one or more data fields, thereby creating a set of buckets and a respective query for each bucket; and creating a respective folder corresponding to each bucket, whose respective query corresponds to data values in the respective bucket.

16. The computer system of claim 15, wherein the one or more programs further comprise instructions that execute in response to adding or removing images from the collection of images to regenerate the hierarchical set of search folders according to the sequence of one or more data fields.

17. The computer system of claim 11, further comprising sorting the list of identified images of the first search folder according to whether each image is retrieved from performing step (i), step (ii), or step (iv).

18. A non-transitory computer readable storage medium storing one or more programs configured for execution by one or more processors of a computer system for searching image catalogs, the one or more programs comprising instructions for:

receiving user input to select a first search folder in the hierarchical set of search folders;

in response to the user input, identifying images that are currently associated with the first search folder using a recursive traversal of the hierarchical set starting at the first search folder, including, for each search folder in the traversal:

(i) executing a respective predefined query that specifies search terms for the respective search folder to dynamically retrieve a list of images, if any, from the collection of images, that satisfy the search terms of the respective predefined query for the respective search folder;

(ii) identifying images, if any, from the collection of images, that are individually associated with the first respective search folder;

(iii) determining whether the respective search folder includes one or more subfolders, each of the one or more subfolders comprising a respective search folder in the hierarchical set of search folders; and (iv) in accordance with a determination that the respective search folder includes one or more subfolders, recursively performing (i), (ii), (iii), and (iv) on each of the one or more subfolders of the respective search folder, to retrieve a list of images, if any, contained in the one or more subfolders of the respective search folder; and displaying a list of the identified images as contents of the first search folder to the user.

19. The computer readable storage medium of claim 18, further comprising instructions for generating the hierarchical set of search folders for the collection of images, including:
   receiving user specification of a sequence of one or more data fields corresponding to each image in the collection of images;
   aggregating data values for the sequence of one or more data fields, thereby creating a set of buckets and a respective query for each bucket; and
   creating a respective folder corresponding to each bucket, whose respective query corresponds to data values in the respective bucket.

\* \* \* \* \*